United States Patent
He et al.

(10) Patent No.: US 11,254,790 B2
(45) Date of Patent: Feb. 22, 2022

(54) SILICONE RUBBER AND PHENOLIC MODIFIED SILICONE RUBBER AND METHODS FOR PREPARING THE SAME

(71) Applicant: Aerospace Research Institute of Materials & Processing Technology, Beijing (CN)

(72) Inventors: Chen He, Beijing (CN); Wu Lu, Beijing (CN); Boqian Li, Beijing (CN); Yibing Zeng, Beijing (CN); Junshan Wang, Beijing (CN)

(73) Assignee: AEROSPACE RESEARCH INSTITUTE OF MATERIALS & PROCESSING TECHNOLOGY, Beijing (CN)

( * ) Notice: Subject to any disclaimer, the term of this patent is extended or adjusted under 35 U.S.C. 154(b) by 45 days.

(21) Appl. No.: 16/647,767

(22) PCT Filed: Sep. 14, 2018

(86) PCT No.: PCT/CN2018/105715
§ 371 (c)(1),
(2) Date: Mar. 16, 2020

(87) PCT Pub. No.: WO2020/051875
PCT Pub. Date: Mar. 19, 2020

(65) Prior Publication Data
US 2021/0221958 A1    Jul. 22, 2021

(30) Foreign Application Priority Data
Sep. 10, 2018 (CN) .......................... 201811051068.7

(51) Int. Cl.
*C08G 77/08* (2006.01)
*C08G 77/52* (2006.01)
(Continued)

(52) U.S. Cl.
CPC ............. *C08G 77/52* (2013.01); *C08G 77/08* (2013.01); *C08G 77/12* (2013.01); *C08G 77/20* (2013.01);
(Continued)

(58) Field of Classification Search
CPC ...... C08G 77/388; C08G 77/12; C08G 77/20; C08G 77/08; C08G 8/36; C08L 83/04
See application file for complete search history.

(56) References Cited

U.S. PATENT DOCUMENTS

| | | |
|---|---|---|
| 2002/0192477 A1 | 12/2002 | Honda et al. |
| 2003/0220448 A1 | 11/2003 | Ozai et al. |
| 2017/0158841 A1 | 6/2017 | Matsuda et al. |

FOREIGN PATENT DOCUMENTS

| | | | |
|---|---|---|---|
| CN | 1303879 | * | 7/2001 |
| CN | 1303879 A | | 7/2001 |

(Continued)

OTHER PUBLICATIONS

SIPO, International Search Report issued in IA No. PCT/CN2018/105715, dated Jun. 17, 2019.
(Continued)

*Primary Examiner* — Kuo Liang Peng
(74) *Attorney, Agent, or Firm* — Lorenz & Kopf, LLP

(57) ABSTRACT

The present invention discloses a silicone rubber and a method for preparing it, and a phenolic modified silicone rubber resin and a method for preparing it. The structural formula of the silicone rubber is shown as follows:

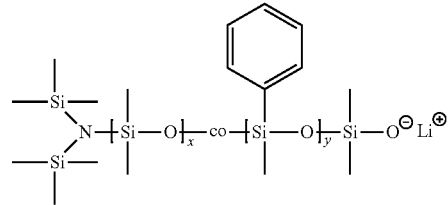

Wherein x=70-80, y=10-20.
The structural formula of the phenolic-modified silicone rubber resin is shown as follows:

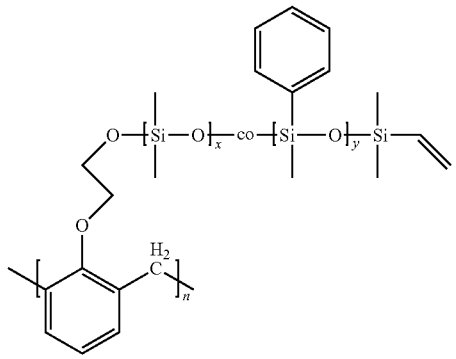

wherein n, x, y are degrees of polymerization, n=10-20, x=70-80, y=10-20. A method for preparing the phenolic-modified silicone rubber resin orderly comprises: adding 90-110 parts by mass of brominated phenolic resin and 180-220 parts of organic solvent into 100 parts by mass of silicone rubber, reacting at 70-80° C. for 24-48 h until the solution is clear and transparent; adding 9-11 parts by mass of capping agent, reacting for another 4-5 h to obtain a reaction liquid containing phenolic-modified silicone rubber resin. The phenolic-modified silicone rubber resin prepared in the present invention can solve the problem of easy pulverization (Continued)

in the ablation process of conventional silicone rubber and meanwhile has high mechanical properties.

20 Claims, 1 Drawing Sheet

(51) Int. Cl.
*C08G 77/12* (2006.01)
*C08G 77/20* (2006.01)
*C08G 77/42* (2006.01)
*C08G 77/54* (2006.01)

(52) U.S. Cl.
CPC .............. *C08G 77/42* (2013.01); *C08G 77/54* (2013.01); *C08G 2150/00* (2013.01); *C08G 2330/00* (2013.01)

(56) References Cited

FOREIGN PATENT DOCUMENTS

| | | |
|---|---|---|
| CN | 103601892 A | 2/2014 |
| CN | 103709407 A | 4/2014 |
| CN | 106397699 A | 2/2017 |
| CN | 108239285 A | 7/2018 |
| GB | 980107 A | 1/1965 |

OTHER PUBLICATIONS

SIPO, Office Action issued in Chinese Application No. 201811051068.7, dated Jan. 6, 2020.

* cited by examiner

SILICONE RUBBER AND PHENOLIC MODIFIED SILICONE RUBBER AND METHODS FOR PREPARING THE SAME

CROSS-REFERENCE TO RELATED APPLICATIONS

This application is a U.S. National-Stage entry under 35 U.S.C. § 371 based on International Application No. PCT/CN2018/105715, filed Sep. 14, 2018, which was published under PCT Article 21(2) and which claims priority to Chinese Application No. 201811051068.7, filed Sep. 10, 2018, which are all hereby incorporated in their entirety by reference.

FIELD OF THE APPLICATION

The present invention belongs to a technical field of silicone rubber resin, and particularly relates to a silicone rubber, a phenolic modified silicone rubber resin and methods for preparing them. The phenolic modified silicone rubber resin can be used for preparing ablative thermal protection coatings and thermal insulation composite materials.

BACKGROUND OF THE APPLICATION

Ablative thermal protection coating having the characteristics of high thermal protection efficiency and simple construction is one of the first schemes of thermal protection for the outer surface of complex structure. Resin matrix is one of the key factors affecting the properties of ablative thermal protection materials, and the silicone rubber is mainly used as the resin matrix for the ablative thermal protection materials in the medium and high heat flow environment at present, for example, the silicone rubber is used for preparing flame resistant ablative material in the US patents US20030220448 and US20170158841. As the main chain of silicone rubber matrix is prone to chain degradation at high temperature, the ablation layer of silicone rubber is severely pulverized under the medium and high heat flow, and the resistance to airflow shear thereof is poor, and the ablation thermal efficiency thereof is low. The existing silicone rubber based ablative thermal protection material can only realize thermal protection by increasing its own thickness, which results in the obvious overweight of thermal protection structure. Therefore, it is one of the important problems in the field of resin-based ablative thermal protection materials at present how the silicone rubber is prepared and modified to make the silicone rubber based ablative thermal protection material form a stable carbide layer in the medium and high heat flow environment, thereby solving the problem of silicone rubber ablation thermal protection coating pulverization and improving the ablation thermal efficiency of the silicon rubber.

SUMMARY

Aiming at the defects of existing technology, one object of the present invention is to provide a silicone rubber and a method for preparing the silicone rubber.

Another object of the present invention is to provide a phenolic modified silicone rubber resin and a method for preparing the phenolic modified silicone rubber resin.

In order to achieve the above-mentioned objects, following technical solutions are adopted in the present invention.

A silicone rubber, a structure of which is shown as following formula I:

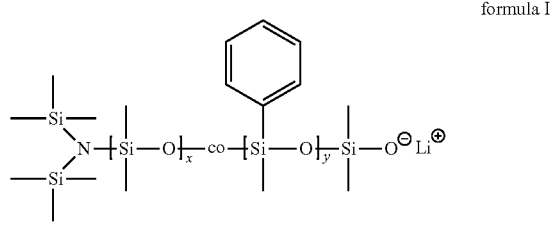

formula I wherein x=70-80, y=10-20.

In the above-mentioned silicone rubber, preferably, number-average molecular weight of the silicone rubber is 10 kDa-15 kDa, viscosity of the silicone rubber is 5000 mPa·s-7000 mPa·s, and molecular weight distribution of the silicone rubber is 1.3-1.4.

A method for preparing the silicone rubber comprises:

dissolving 100 parts by mass of octamethylcyclotetrasiloxane and 18-22 parts by mass of tetramethyltetraphenylcyclotetrasiloxane into a solvent, cooling, evacuating, introducing an inert gas, and then adding 0.4-0.6 parts by mass of lithium hexamethyldisilazane, reacting at 60-70° C. (such as 61° C., 62° C., 63° C., 64° C., 65° C., 66° C., 67° C., 68° C., 69° C.) for at least 6 h (such as 7 h, 8 h, 9 h, 10 h and the like) to obtain the silicone rubber. The synthesis reaction is shown as following equation 1:

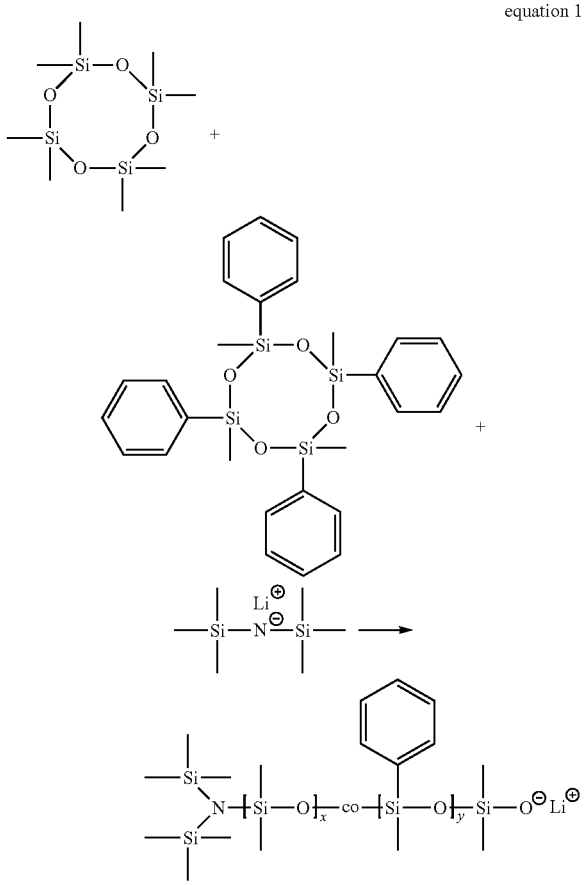

equation 1

In the above-mentioned method for preparing the silicone rubber, lithium hexamethyldisilazane is used to initiate reaction so that no by-product of small molecule rings is produced in the reaction, and molecular weight distribution of product is narrow, avoiding the disadvantage that the silicone rubber, produced by traditional preparing methods in which KOH or tetramethylammonium hydroxide is used as an initiator, has a wide molecular weight distribution and a large number of small molecular rings.

In the above-mentioned method for preparing the silicone rubber, as one preferred embodiment, the octamethylcyclotetrasiloxane and tetramethyltetraphenylcyclotetrasiloxane are dissolved into the solvent in a dry and anhydrous atmosphere with a pressure of 1000-1100 mbar.

In the above-mentioned method for preparing the silicone rubber, as one preferred embodiment, the cooling is performed until the temperature is −60~−50° C. (such as −58° C., −56° C., −54° C., −52° C.).

In the above-mentioned method for preparing the silicone rubber, as one preferred embodiment, the evacuation is performed until the pressure is 10-20 mbar.

In the above-mentioned method for preparing the silicone rubber, as one preferred embodiment, the introduction of the inert gas is performed until the pressure is 1000-1100 mbar.

In the above-mentioned method for preparing the silicone rubber, as one preferred embodiment, the inert gas is nitrogen or argon.

In the above-mentioned method for preparing the silicone rubber, as one preferred embodiment, the solvent is toluene or xylene.

In the above-mentioned method for preparing the silicone rubber, as one preferred embodiment, a step for synthetizing the lithium hexamethyldisilazane comprises: dissolving 16 parts by mass of hexamethyldisilazane into 40-50 parts by mass of gasoline, and then adding dropwise 6-7 parts by mass of n-butyl lithium, performing the reaction to obtain the lithium hexamethyldisilazane. In the process of dropwise addition and reaction, the inert gas is continuously introduced. The synthesis reaction of lithium hexamethyldisilazane is shown as following equation 2:

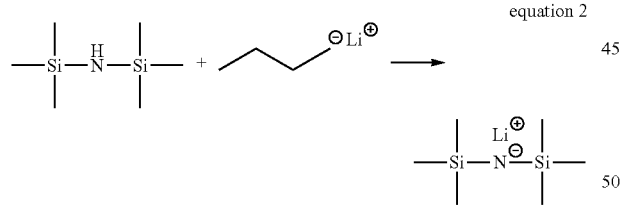

equation 2

In the above-mentioned method for preparing the silicone rubber, as one preferred embodiment, the dropwise addition in the above-mentioned step for synthetizing the lithium hexamethyldisilazane lasts for above 30 min to prevent reaction from being too strongly exothermic, and more preferably 30-40 min (such as 31 min, 32 min, 33 min, 34 min, 35 min, 36 min, 37 min, 38 min, 39 min).

In the above-mentioned method for preparing the silicone rubber, as one preferred embodiment, in the above-mentioned step for synthetizing the lithium hexamethyldisilazane, the temperature of the reaction is controlled to 10-20° C. (such as 11° C., 12° C., 13° C., 14° C., 15° C., 16° C., 17° C., 18° C., 19° C.).

In the above-mentioned method for preparing the silicone rubber, as one preferred embodiment, in the above-mentioned step for synthetizing the lithium hexamethyldisilazane, the inert gas is nitrogen or argon.

As phenolic resin has the characteristics of high carbon residue rate after ablation and stable ablative carbide layer, phenolic resin is used to modify silicone rubber in the present invention so as to solve the problem of serious pulverization of existing silicone rubber, and meanwhile enhance the intensity of ablative layer and improve ablative thermal efficiency thereof. In addition, phenolic resin itself is a rigid polymer, silicone rubber can form a hard segment-soft segment structure after it is modified using phenolic resin, thereby achieving the improvement of the mechanical properties of silicone rubber. However, due to the large difference between the solubility parameters of epoxy resin and silicone rubber, obvious phase separation is prone to occur using the common physical blending. And silicone rubber cannot be modified by simple chemical grafting because of its stable chemical properties. At present, ordinary silicone rubber grafting modification is to trigger methyl pendant to generate free radicals by peroxides. However, this reaction has poor controllability and is prone to gelation during the modification, which makes the prepared resin unable to be further processed and used. In the present invention, the method of coupling onto is used, in which Lewis alkali at the active end of silicon rubber attacks the bromine atom on the side chain of the bromized phenolic resin, the reaction has high efficiency and strong controllability, and can avoid the gelation phenomenon occurring.

A phenolic modified silicone rubber resin prepared using the silicone rubber is provided, the structure formula of which is shown as following formula II:

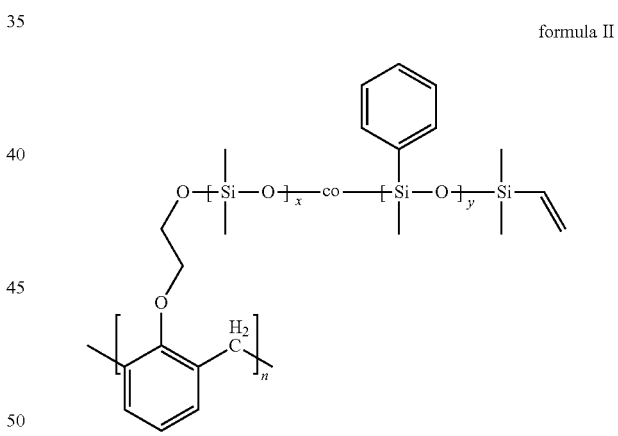

formula II wherein n, x, y are degrees of polymerization, n=10-20, x=70-80, y=10-20.

The number-average molecular weight of the phenolic modified silicone rubber resin is 20-30 kDa, viscosity of the phenolic modified silicone rubber resin is 10000 mPa·s-15000 mPa·s, and molecular weight distribution of the phenolic modified silicone rubber resin is 2-3.

A method for preparing the above-mentioned phenolic modified silicone rubber resin successively comprises:

a step of chemical grafting modification which comprises: adding 90-110 (such as 92, 94, 96, 98, 100, 102, 104, 106, 108) parts by mass of brominated phenolic resin and 180-220 parts of organic solvent into 100 parts by mass of silicone rubber, reacting at 70-80° C. (such as 71° C., 72° C., 73° C., 74° C., 75° C., 76° C., 77° C., 78° C., 79° C.) for 24-48 h (such as 26 h, 28 h, 30 h, 34 h, 36 h, 40 h, 44 h, 46 h) until the solution is clear and transparent;

a step of end capping which comprises: adding 9-11 parts by mass of capping agent, reacting for 4-5 h to obtain a reaction liquid containing phenolic modified silicone rubber resin.

In the method for preparing the above-mentioned phenolic modified silicone rubber resin, the reaction temperature and reaction time used in the present invention can ensure the reaction to proceed and avoid the cross-linking reaction and gelation phenomenon caused by too long time or too high temperature.

In the method for preparing the above-mentioned phenolic modified silicone rubber resin, as one preferred embodiment, the method further comprises a step of removal of organic solvent and small molecular which comprises: removing the organic solvent from the reaction liquid containing the phenolic modified silicone rubber resin at 100-110° C. and a pressure of 10-20 mbar and removing the small molecular by scraper distillation at 150-160° C. and a pressure of 0.1-0.2 mbar to obtain the phenolic modified silicone rubber resin being target product.

In the method for preparing the above-mentioned phenolic modified silicone rubber resin, as one preferred embodiment, the organic solvent is toluene or xylene.

In the method for preparing the above-mentioned phenolic modified silicone rubber resin, as one preferred embodiment, the capping agent is divinyltetramethyldisiloxane or vinyldimethylchlorosilane, and the end capping is performed using the capping agent to introduce the vinyl active group, so that the prepared phenolic modified silicone rubber resin is cured.

In the method for preparing the above-mentioned phenolic modified silicone rubber resin, as one preferred embodiment, a step for synthetizing the brominated phenolic resin comprises:

dissolving 100 parts by mass of phenolic resin and 15-25 parts by mass of bromoethanol into a first solvent, adding 25-35 parts by mass of potassium carbonate, heating up to 80-85° C. and performing reflux reaction at this temperature for 20-28 h, filtering out insoluble substance, and then reducing pressure to remove the residual of the first solvent to obtain hydroxylated phenolic resin; dissolving the hydroxylated phenolic resin into 80-120 parts by mass of a second solvent, adding 8-12 parts by mass of phosphorus tribromide and 18-22 parts by mass of pyridine, reacting for 20-28 h, later reducing pressure to remove the second solvent to obtain the brominated phenolic resin, the reaction process is shown in following equation 3.

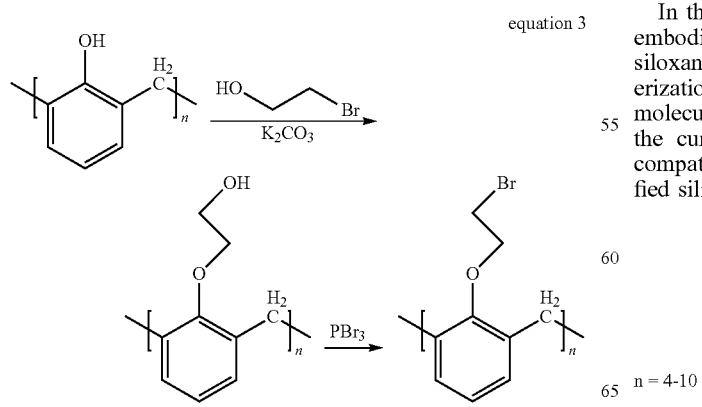

equation 3

In the above-mentioned step of synthetizing the brominated phenolic resin, addition of potassium carbonate can change phenolic hydroxyl of phenolic resin into potassium phenolate group, thereby promoting ether formation reaction between phenolic resin and bromoethanol. Since the phenolic hydroxyl group cannot be directly brominated by phosphorous tribromide, the phenolic hydroxyl is changed into aliphatic hydroxyl by adding the bromoethanol in the present invention, achieving bromination. Mole number of bromine in the phosphorus tribromide is greater than mole number of hydroxyl in the bromoethanol, ensuring that the hydroxyl can be completely brominated. Preferably, the molar ratio of the bromine in the phosphorus tribromide to the hydroxyl in the bromoethanol is 1.3:1.

In the above-mentioned step of synthetizing the brominated phenolic resin, as one preferred embodiment, the first solvent is acetone. The acetone acts as the solvent but also provides a certain polarity, so as to make the phenolic hydroxyl easier to form salt with potassium carbonate, thereby taking place a substitution reaction.

In the above-mentioned step of synthetizing the brominated phenolic resin, as one preferred embodiment, the second solvent is dichloromethane or trichloromethane.

In the above-mentioned step of synthetizing the brominated phenolic resin, as one preferred embodiment, the phenolic resin is linear phenolic resin which is soluble in the first solvent. More preferably, degree of polymerization of the phenolic resin is 10 to 20, and its chemical structure is shown as formula III. If the phenolic resin is space phenolic resin, or the degree of polymerization is too high and molecular weight is too large, resin is difficult to dissolve.

formula III

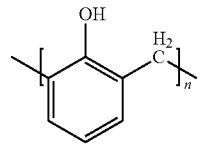

n = 10-20

In the above-mentioned method for preparing the phenolic modified silicone rubber resin, as one preferred embodiment, the method further comprises a step of curing which includes: taking 100 parts by mass of the obtained phenolic modified silicone rubber resin, adding 4-6 parts by mass of hydrogen-containing polysiloxane and 0.1-0.2 parts by mass of platinum catalyst thereinto, mixing, and then being placed for above 48 h at room temperature to obtain a cured phenolic modified silicone rubber resin.

In the above-mentioned step of curing, as one preferred embodiment, a structure of the hydrogen-containing polysiloxane is shown as the formula IV, and degree of polymerization of the hydrogen-containing polysiloxane is 4-10. If molecular weight is too small, it is easily volatilized during the curing. while if molecular weight is too large, the compatibility between curing agent and the phenolic modified silicone rubber will be affected.

Formula IV

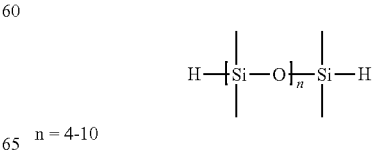

n = 4-10

Preferably, the platinum catalyst is chloroplatinic acid or a complex of zero-valent platinum with divinyltetramethyl-disiloxane. Further preferably, the platinum catalyst is custer catalyst, a chemical structure of which is shown as Formula V:

Formula V

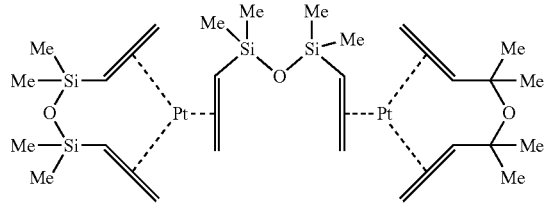

In the method for preparing the phenolic modified silicone rubber resin, as one preferred embodiment, a specific reaction process is shown in equation 4.

equation 4

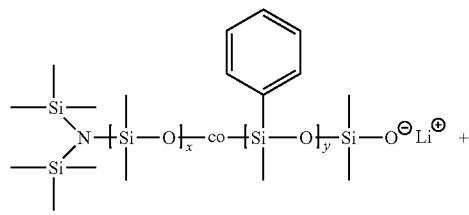

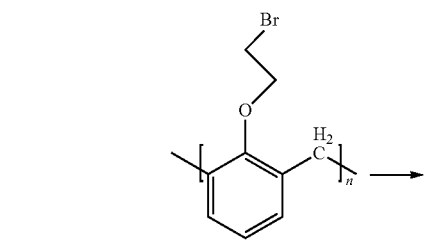

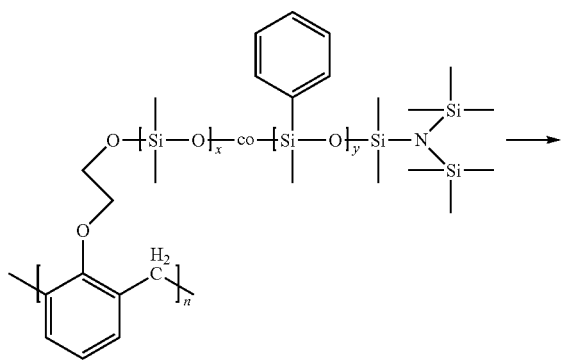

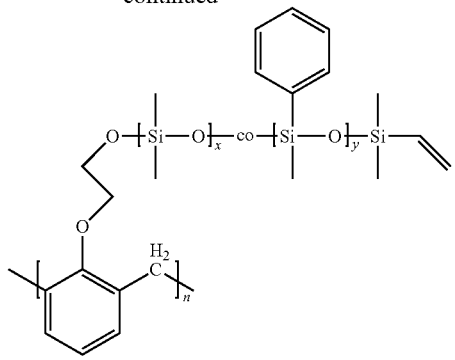

In the equation 4, co represents random copolymerization.

Compared with prior art, the present invention has the following beneficial effects:

(1) Comparing the phenolic modified silicone rubber resin in the present invention with ordinary industrial silicone rubber, a stable carbide layer is formed after the phenolic modified silicone rubber resin prepared in the present invention is ablated at 600° C. while ordinary silicone rubber disintegrates after being ablated.

(2) Compared with industrial silicone rubber, tensile strength of the phenolic modified silicone rubber resin in the present invention is much higher than that of ordinary industrial silicone rubber.

(3) The phenolic modified silicone rubber resin in the present invention can avoid the problem of easy pulverization present in the ablation process of conventional silicone rubber and has high mechanical properties. When the phenolic modified silicone rubber resin in the present invention is adopted instead of the existing silicone rubber to prepare the ablative thermal protection material, the ablative thermal efficiency thereof can be greatly improved.

(4) The coupling onto grafting modification method in the present invention can achieve the chemical modification on silicone rubber by phenolic resin without phase separation, thereby avoiding the disadvantage that the significant phase separation between phenolic resin and silicone rubber occurs in the conventional physical blending modification method.

(5) The chemical reaction used in the preparation of phenolic modified silicone rubber resin is controllable, which overcomes the technical problem that conventional silicone rubber modification process cannot be controlled.

(6) In the preparation of phenolic modified silicone rubber resin in the present invention, the reaction efficiency is high, the controllability is strong and the gelation phenomenon can be avoided.

DETAILED DESCRIPTION OF THE EMBODIMENTS

Figure 1:
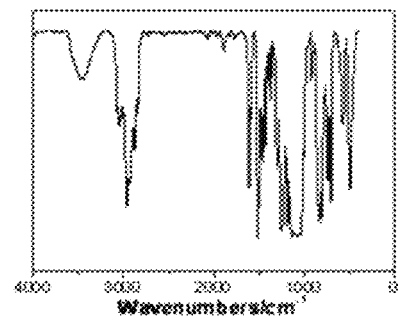
FIG. 1 is an infrared spectrogram of phenolic modified silicone rubber resin prepared in the example 1.

The present invention will be described in detail below by examples in combination with the accompanying drawings, and the protection scope of the present invention includes but is not limited to the following examples. The reagents involved in the following examples, unless otherwise specified, are purchased from conventional chemical reagent stores. The test methods and preparation methods involved all are conventional methods unless otherwise specified.

Phenolic resin in the following examples is PF-1000 produced by Shandong Shengquan Technology Co., LTD. Hydrogen-containing polysiloxane is the full hydrogen-containing silicone oil from Shanghai Guiyou New Materials Co., LTD. Custer catalyst is PS7106c from guangzhou huigu chemistry.

EXAMPLE 1

100 g phenolic resin with polymerization degree of 10-20, 20 g bromoethanol and 100 g acetone were added into a 500 Ml reactor, and then 30 g potassium carbonate was added. The temperature was increased to 85° C., and reflux reaction was performed for 24 h. The pressure was reduced to 10 mbar to remove the residual acetone after insoluble substance was filtered out, and thus the hydroxylated phenolic resin was obtained. The obtained hydroxylated phenolic resin was dissolved into 100 g dichloromethane and then 10 g phosphorus tribromide and 20 g pyridine were added, the reaction was performed for 24 h. The pressure was reduced to 10 mbar to remove the redundant solvent, thus the brominated phenolic resin was obtained.

1.6 g hexamethyldisilazane was dissolved into 4.5 g gasoline, and then 0.6 g n-butyl lithium was added dropwise thereinto. The reaction was performed to obtain lithium hexamethyldisilazane. Wherein the dropwise addition of n-butyl lithium lasted for 30 min, and the reaction temperature was controlled to 15° C. In the process of dropwise addition and reaction, nitrogen or argon was continuously introduced into the reaction system.

A 500 mL reactor was evacuated to 10-20 mbar and heated to 120° C. to remove water molecule. The temperature was reduced to room temperature at a rate of 5° C./min and the pressure in the reactor was recovered to 1000 mbar. 100 g octamethylcyclotetrasiloxane and 20 g tetramethyl-tetraphenyl cyclotetrasiloxane were added into the reactor, and then 100 g xylene was added. The temperature was reduced to −50° C., and evacuation was performed until the pressure was 10 mbar. And then nitrogen or argon was introduced into until the pressure in the reactor reached 1000 mbar, and 0.4 g lithium hexamethyldisilazane was added to initiate reaction. Anion polymerization reaction was performed at 60° C. for 6 h, thereby obtaining the silicone rubber. Molecular weight distribution of the obtained silicone rubber is 1.33, number-average molecular weight thereof is 13 kDa, viscosity thereof is 5500 mPa·s.

100 g brominated phenolic resin and 200 g xylene were added into 100 g silicone rubber, reaction was performed at 80° C. for 24 h until solution was clear and transparent. 10 g divinyltetramethyldisiloxane as a capping agent was added and the reaction was continued to perform for 5 h, and reaction liquid containing phenolic modified silicone rubber resin was obtained. Later the xylene was removed from the reaction liquid containing phenolic modified silicone rubber resin at 110° C. and a pressure of 10 mbar, and then small molecules were removed at 150° C. and a pressure of 0.1 mbar by scraper distillation (the scraper distillation herein in the present invention is an efficient molecular distillation method originally created by POPE corporation of the United States, details can be seen on the website of www-.popechina.com), and phenolic modified silicone rubber resin was obtained. Molecular weight distribution of the obtained phenolic modified silicone rubber resin is 2.44, number-average molecular weight thereof is 26000 Da, viscosity thereof is 13000 mPa·s.

5 g hydrogen-containing polysiloxane with polymerization degree of 3-6 and 0.2 g custer platinum catalyst were added into 100 g phenolic modified silicone rubber resin, and followed by being placed for above 48 h at room temperature to finish curing. The properties of resin after curing were tested and the result was shown in table 1. Tensile strength and elongation at break were tested according to GB/T1040.2, shore A hardness was tested by shore durometer, and tensile-shear strength was tested by snapping the aluminum sheets that were bonded to each other

TABLE 1

| mechanical properties of resin after curing in the example 1 | |
|---|---|
| test items | test result |
| tensile strength MPa | 1.5 |
| elongation at break % | 100 |
| Shore A hardness | 60 |
| tensile-shear strength MPa | 1.0 |

108-2 silicone rubber produced by Shanghai resin factory was test according to the test method of the above-mentioned tensile strength and tensile-shear strength, and the test result thereof is that tensile strength is 0.4 Mpa and tensile-shear strength is 0.2 Mpa.

FIG. 1 is an infrared spectrogram of phenolic modified silicone rubber resin prepared in the example 1. There are obvious absorption peaks at 1261 $cm^{-1}$, 1090 $cm^{-1}$, 1040 $cm^{-1}$ and 800 $cm^{-1}$ which are stretching vibration peaks of Si—C, Si—O and rocking vibration peak of Si—C in the silicon rubber, and there are obvious absorption peaks in 3360 $cm^{-1}$, 1581 $cm^{-1}$, 1455 $cm^{-1}$ and 800 $cm^{-1}$ which are stretching vibration peaks of benzene ring and phenolic hydroxyl of phenol respectively, showing that the phenolic modified silicone rubber resin is synthesized successfully.

Figure 2:
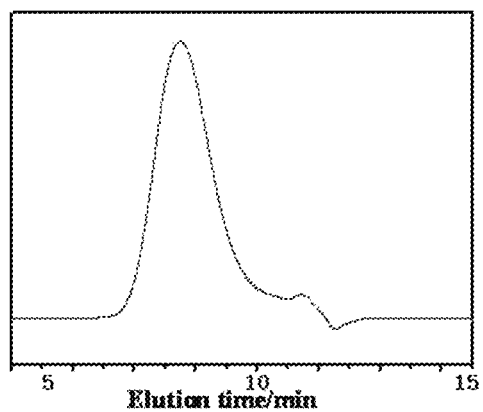
FIG. 2 is a gel permeation chromatogram of phenolic modified silicone rubber resin prepared in the example 1.

FIG. 2 is a gel permeation chromatogram of phenolic modified silicone rubber resin prepared in the example 1. It is obtained by calculating according to the information in the gel permeation chromatogram that the number-average molecular weight of obtained phenolic modified silicone rubber resin is 26000 Da and the molecular weight distribution thereof is 2.44.

Figure 3:
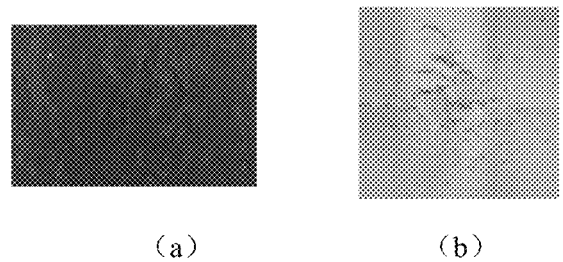
FIG. 3 shows appearances of phenolic modified silicone rubber resin prepared in the example 1 and conventional industry silicone rubber after being ablated at 600° C. for 5 min, in which (a) shows appearance of phenolic modified silicone rubber resin prepared in the example 1 after being ablated at 600° C. and (b) shows appearance of conventional industry silicone rubber after being ablated at 600° C. for 5 min.

FIG. 3 shows appearances of phenolic modified silicone rubber resin prepared in the example 1 and 108 phenyl silicone rubber after being ablated at 600° C. for 5 min. It can be seen that a stable carbide layer is formed after the phenolic modified silicone rubber resin prepared in the example 1 is ablated at 600° C. (as shown in FIG. 3(a)). A modified silicone rubber resin after being ablated in the present invention has tensile strength of 1 MPa and shore D hardness value of 70. However, 108 phenyl silicone rubber in conventional industry disintegrates after being ablated (as shown in FIG. 3(b)). The thermal decomposition products of phenolic modified silicone rubber resin of example 1 are different from those of conventional 108 phenyl silicone rubber. Silicon dioxide powder is produced after conventional silicone rubber is decomposed, thus it may disintegrate when being applied in a high temperature environment. However, dense carbide layer still can be formed after thermal decomposition of the new phenolic modified silicone rubber resin in the example 1 of the present invention, and it can be applied in the high temperature environment.

EXAMPLE 2

100 g phenolic resin with polymerization degree of 10-20, 18 g bromoethanol and 100 g acetone were added into a 500 mL reactor, and then 25 g potassium carbonate was added. The temperature was increased to 80° C., and reflux reaction was performed for 24 h. The pressure was reduced to 10 mbar to remove the residual acetone after insoluble substance was filtered out, and the hydroxylated phenolic resin was obtained. The obtained hydroxylated phenolic resin was dissolved into 100 g dichloromethane and then 9 g phosphorus tribromide and 18 g pyridine were added, the reaction was performed for 24 h. The pressure was reduced to 10 mbar to remove the redundant solvent and the brominated phenolic resin was obtained.

1.6 g hexamethyldisilazane was dissolved into 4 g gasoline, and then 0.6 g n-butyl lithium was added dropwise thereinto. The reaction was performed and then the lithium hexamethyldisilazane was obtained. Wherein, the dropwise addition of n-butyl lithium lasted for 30 min, and the reaction temperature was controlled to 10° C. In the process of dropwise addition and reaction, nitrogen or argon was continuously introduced into the reaction system.

A 500 mL reactor was evacuated to 10-20 mbar and heated to 120° C. to remove water molecule. The temperature was reduced to room temperature at a rate of 5° C./min and the pressure in the reactor was recovered to 1000 mbar. 100 g octamethylcyclotetrasiloxane and 18 g tetramethyltetraphenylcyclotetrasiloxane were added into the reactor, and then 100 g xylene was added. The temperature was reduced to −50° C., and evacuation was performed until the pressures was 10 mbar. And nitrogen or argon was introduced into until the pressure in the reactor reached 1000 mbar, and 0.4 g lithium hexamethyldisilazane was added to initiate reaction. Anion polymerization reaction was performed at 60° C. for 6 h, and the silicone rubber was obtained. Molecular weight distribution of the obtained silicone rubber is 1.32, number-average molecular weight of the obtained silicone rubber is 10 kDa, viscosity of the obtained silicone rubber is 5200 mPa·s.

90 g brominated phenolic resin and 100 g xylene were added into 100 g silicone rubber, reaction was performed at 80° C. for 48 h until solution was clear and transparent. 9 g divinyltetramethyldisiloxane as a capping agent was added and the reaction was continued to perform for 5 h, and reaction liquid containing phenolic modified silicone rubber resin was obtained. Later the xylene was removed from the reaction liquid containing phenolic modified silicone rubber resin at 100° C. and a pressure of 10 mbar, and then small molecules were removed at 150° C. and a pressure of 0.1 mbar by scraper distillation which is the same as that in the example 1, and thus phenolic modified silicone rubber resin was obtained. Molecular weight distribution of the obtained phenolic modified silicone rubber resin is 2.51, number-average molecular weight thereof is 28000 Da, viscosity thereof is 13000 mPa·s.

4 g hydrogen-containing polysiloxane with polymerization degree of 3-6 and 0.1 g custer platinum catalyst were added into 100 g phenolic modified silicone rubber resin, followed by being placed for above 48 h at room temperature to finish the curing. The properties of resin after curing were tested and the result was shown in table 2. Tensile strength and elongation at break were tested according to GB/T1040.2, shore A hardness was tested by shore durometer, and tensile-shear strength was tested by snapping the aluminum sheets that were bonded to each other.

TABLE 2

| mechanical properties of resin after curing in the example 2 | |
|---|---|
| test items | test result |
| tensile strength MPa | 1.3 |
| elongation at break % | 120 |
| Shore A hardness | 50 |
| tensile-shear strength MPa | 0.8 |

A stable carbide layer is formed after the phenolic modified silicone rubber resin prepared in the example 2 is ablated at 600° C. The modified silicone rubber resin after being ablated has tensile strength of 1 MPa and shore D hardness value of 70.

EXAMPLE 3

100 g phenolic resin with polymerization degree of 10-20, 22 g bromoethanol and 100 g acetone were added into a 500 mL reactor, and then 30 g potassium carbonate was added. The temperature was increased to 85° C., and reflux reaction was performed for 24 h. The pressure was reduced to 10 mbar to remove the residual acetone after insoluble substance was filtered out, and the hydroxylated phenolic resin was obtained. The obtained hydroxylated aldehyde resin was dissolved into 100 g dichloromethane and then 11 g phosphorus tribromide and 22 g pyridine were added, the reaction was performed for 24 h. The pressure was reduced to 10 mbar to remove the redundant solvent, and the brominated phenolic resin was obtained.

1.6 g hexamethyldisilazane was dissolved into 5 g gasoline, and then 0.7 g n-butyl lithium was added dropwise thereinto. The reaction was performed and then the lithium hexamethyldisilazane was obtained. Wherein, the dropwise addition of n-butyl lithium lasted for 40 min, and the reaction temperature was controlled to 20° C. In the process of dropwise addition and reaction, nitrogen or argon was continuously introduced into the reaction system.

A 500 mL reactor was evacuated to 20 mbar and heated to 120° C. to remove water molecule. The temperature was reduced to room temperature at a rate of 10° C./min and the pressure in the reactor was recovered to 1000 mbar. 100 g octamethylcyclotetrasiloxane and 22 g tetramethyltetraphenylcyclotetrasiloxane were added into the reactor, and then 100 g xylene was added. The temperature was reduced to −50° C., and evacuation was performed until the pressures was 20 mbar. And nitrogen or argon was introduced into until the pressure in the reactor reached 1000 mbar, and 1 g lithium hexamethyldisilazane was added to initiate reaction. Anion polymerization reaction was performed at 70° C. for 6 h, and the silicone rubber was obtained. Molecular weight distribution of the obtained silicone rubber is 1.40, number-average molecular weight thereof is 15 kDa, viscosity thereof is 6000 mPa·s.

100 g brominated phenolic resin and 200 g xylene were added into 100 g silicone rubber, reaction was performed at 80° C. for 24 h until solution was clear and transparent. 11 g divinyltetramethyldisiloxane as a capping agent was added and the reaction was continued to perform for 5 h, and reaction liquid containing phenolic modified silicone rubber resin was obtained. Later the xylene was removed from the reaction liquid containing phenolic modified silicone rubber resin at 110° C. and a pressure of 20 mbar, and then small molecules were removed at 150° C. and a pressure of 0.2 mbar by scraper distillation which is the same as that in the example 1, and phenolic modified silicone rubber resin was obtained. Molecular weight distribution of the obtained phenolic modified silicone rubber resin is 2.35, number-average molecular weight thereof is 26000 Da, viscosity thereof is 12000 mPa·s.

6 g hydrogen-containing polysiloxane with polymerization degree of 3-6 and 0.2 g custer platinum catalyst were added into 100 g phenolic modified silicone rubber resin, followed by being placed for above 48 h at room temperature to finish the curing. The properties of resin after curing were tested and the result was shown in table 3. Tensile strength and elongation at break were tested according to GB/T1040.2, shore A hardness was tested by shore durometer, and tensile-shear strength was tested by snapping the aluminum sheets that were bonded to each other

TABLE 3 mechanical properties of resin after curing in the example 3

| test items | test result |
| --- | --- |
| tensile strength MPa | 1.5 |
| elongation at break % | 80 |
| Shore A hardness | 70 |
| tensile-shear strength MPa | 1.0 |

A stable carbide layer is formed after the phenolic modified silicone rubber resin prepared in the example 3 is ablated at 600° C. The modified silicone rubber resin after being ablated has tensile strength of 1 MPa and shore D hardness value of 70.

EXAMPLE 4

100 g phenolic resin with polymerization degree of 10-20, 20 g bromoethanol and 100 g acetone were added into a 500 mL reactor, and then 30 g potassium carbonate was added. The temperature was increased to 85° C., and reflux reaction was performed for 24 h. The pressure was reduced to 10 mbar to remove the residual acetone after insoluble substance was filtered out, and the hydroxylated phenolic resin was obtained. The obtained hydroxylated aldehyde resin was dissolved into 100 g dichloromethane and then 10 g phosphorus tribromide and 20 g pyridine were added, the reaction was performed for 24 h. The pressure was reduced to 10 mbar to remove the redundant solvent, and the brominated phenolic resin was obtained.

1.6 g hexamethyldisilazane was dissolved into 4.5 g gasoline, and then 0.6 g n-butyl lithium was added dropwise thereinto. The reaction was performed, and then the lithium hexamethyldisilazane was obtained. Wherein, the dropwise addition of n-butyl lithium lasted for 30 min, and the reaction temperature was controlled to 15° C. In the process of dropwise addition and reaction, nitrogen or argon was continuously introduced into the reaction system.

A 500 mL reactor was evacuated to 10-20 mbar and heated to 120° C. to remove water molecule. The temperature was reduced to room temperature at a rate of 5° C./min and the pressure in the reactor was recovered to 1000 mbar. 100 g octamethylcyclotetrasiloxane and 20 g tetramethyltetraphenylcyclotetrasiloxane were added into the reactor, and then 100 g xylene was added. The temperature was reduced to −50° C., and evacuation was performed until the pressures was 10 mbar. And nitrogen or argon was introduced into until the pressure in the reactor reached 1000 mbar, and 0.4 g lithium hexamethyldisilazane was added to initiate reaction. Anion polymerization reaction was performed at 60° C. for 6 h, and the silicone rubber was obtained. Molecular weight distribution of the obtained silicone rubber is 1.33, number-average molecular weight thereof is 13 kDa, viscosity thereof is 5500 mPa·s.

100 g brominated phenolic resin and 200 g xylene were added into 100 g silicone rubber, reaction was performed at 70° C. for 24 h until solution was clear and transparent. 10 g divinyltetramethyldisiloxane as a capping agent was added and the reaction was continued to perform for 5 h, and reaction liquid containing phenolic modified silicone rubber resin was obtained. Later the xylene was removed from the reaction liquid containing phenolic modified silicone rubber resin at 110° C. and a pressure of 10 mbar, and then small molecules were removed at 150° C. and a pressure of 0.1 mbar by scraper distillation (the scraper distillation herein in the present invention is an efficient molecular distillation method originally created by POPE corporation of the United States, details can be seen on the website of www-.popechina.com), and phenolic modified silicone rubber resin was obtained. Molecular weight distribution of the obtained phenolic modified silicone rubber resin is 2.44, number-average molecular weight thereof is 26000 Da, viscosity thereof is 13000 mPa·s.

5 g hydrogen-containing polysiloxane with polymerization degree of 3-6 and 0.2 g custer platinum catalyst were added into 100 g phenolic modified silicone rubber resin, followed by being placed for above 48 h at room temperature to finish the curing. The properties of resin after curing were tested and the result was shown in table 4. Tensile strength and elongation at break were tested according to GB/T1040.2, shore A hardness was tested by shore durometer, and tensile-shear strength was tested by snapping the aluminum sheets that were bonded to each other.

TABLE 4 mechanical properties of resin after curing in the example 4

| test items | test result |
| --- | --- |
| tensile strength MPa | 1.3 |
| elongation at break % | 110 |
| Shore A hardness | 52 |
| tensile-shear strength MPa | 0.9 |

A stable carbide layer is formed after the phenolic modified silicone rubber resin prepared in the example 4 is ablated at 600° C. The modified silicone rubber resin after being ablated has tensile strength of 1 MPa and shore D hardness value of 66.

Comparison Example 1

100 g phenolic resin with polymerization degree of 10-20, 20 g bromoethanol and 100 g acetone were added into a 500 mL reactor, and then 30 g potassium carbonate was added. The temperature was increased to 85° C., and reflux reaction was performed for 24 h. The pressure was reduced to 10 mbar to remove the residual acetone after insoluble substance was filtered out, and the hydroxylated phenolic resin was obtained. The obtained hydroxylated phenolic resin was dissolved into 100 g dichloromethane and then 10 g phosphorus tribromide and 20 g pyridine were added, the reaction was performed for 24 h. The pressure was reduced to 10 mbar to remove the redundant solvent, and the brominated phenolic resin was obtained.

1.6 g hexamethyldisilazane was dissolved into 4.5 g gasoline, and then 0.6 g n-butyl lithium was added dropwise thereinto. The reaction was performed, and then the lithium hexamethyldisilazane was obtained. Wherein, the dropwise addition of n-butyl lithium lasted for 30 min, and the reaction temperature was controlled to 15° C. In the process of dropwise addition and reaction, nitrogen or argon was continuously introduced into the reaction system.

A 500 mL reactor was evacuated to 10-20 mbar and heated to 120° C. to remove water molecule. The temperature was reduced to room temperature at a rate of 5° C./min and the pressure in the reactor was recovered to 1000 mbar. 100 g octamethylcyclotetrasiloxane and 20 g tetramethyltetraphenylcyclotetrasiloxane were added into the reactor, and then 100 g xylene was added. The temperature was reduced to −50° C., and evacuation was performed until the pressures was 10 mbar. And nitrogen or argon was introduced into until the pressure in the reactor reached 1000 mbar, and 0.4 g lithium hexamethyldisilazane was added to initiate reaction. Anion polymerization reaction was performed at 60° C. for 6 h, and the silicone rubber was obtained. Molecular weight distribution of the obtained silicone rubber is 1.33, number-average molecular weight thereof is 13 kDa, viscosity thereof is 5500 mcps.

100 g brominated phenolic resin and 200 g xylene were added into 100 g silicone rubber, reaction was performed at 65° C. for 24 h until solution was clear and transparent. 10 g divinyltetramethyldisiloxane as a capping agent was added and the reaction was continued to perform for 5 h, and reaction liquid containing phenolic modified silicone rubber resin was obtained. Later the xylene was removed from the reaction liquid containing phenolic modified silicone rubber resin at 110° C. and a pressure of 10 mbar, and then small molecules were removed at 150° C. and a pressure of 0.1 mbar by scraper distillation which is the same as that in the example 1, and phenolic modified silicone rubber resin was obtained. Molecular weight distribution of the obtained phenolic modified silicone rubber resin is 1.82, number-average molecular weight thereof is 17000 Da, viscosity thereof is 7000 mPa·s.

5 g hydrogen-containing polysiloxane with polymerization degree of 3-6 and 0.2 g custer platinum catalyst were added into 100 g phenolic modified silicone rubber resin, followed by being placed for above 96 h at room temperature to finish the curing. The properties of resin after curing were tested and the result was shown in table 5. Tensile strength and elongation at break were tested according to GB/T1040.2, shore A hardness was tested by shore durometer, and tensile-shear strength was tested by snapping the aluminum sheets that were bonded to each other.

TABLE 5 mechanical properties of resin after curing in the comparison example 1

| test items | test result |
|---|---|
| tensile strength MPa | 0.5 |
| elongation at break % | 80 |
| Shore A hardness | 30 |
| tensile-shear strength MPa | 0.4 |

The phenolic modified silicone rubber prepared in the comparison example 1 disintegrated after being ablated at 600° C. and powdery materials were formed.

Comparison Example 2

100 g phenolic resin with of polymerization degree of 10-20, 20 g bromoethanol and 100 g acetone were added into a 500 mL reactor, and then 30 g potassium carbonate was added. The temperature was increased to 85° C., and reflux reaction was performed for 24 h. The pressure was reduced to 10 mbar to remove the residual acetone after insoluble substance was filtered out, and the hydroxylated phenolic resin was obtained. The obtained hydroxylated phenolic resin was dissolved into 100 g dichloromethane and then 10 g phosphorus tribromide and 20 g pyridine were added, the reaction was performed for 24 h. The pressure was reduced to 10 mbar to remove the redundant solvent, and the brominated phenolic resin was obtained.

1.6 g hexamethyldisilazane was dissolved into 4.5 g gasoline, and then 0.6 g n-butyl lithium was added dropwise thereinto. The reaction was performed, and then the lithium hexamethyldisilazane was obtained. Wherein, the dropwise addition of n-butyl lithium lasted for 30 min, and the reaction temperature was controlled to 15° C. In the process of dropwise addition and reaction, nitrogen or argon was continuously in into the reaction system.

A 500 mL reactor was evacuated to 10-20 mbar and heated to 120° C. to remove water molecule. The temperature was reduced to room temperature at a rate of 5° C./min and the pressure in the reactor was recovered to 1000 mbar. 100 g octamethylcyclotetrasiloxane and 20 g tetramethyltetraphenylcyclotetrasiloxane were added into the reactor, and then 100 g xylene was added. The temperature was reduced to −50° C., and evacuation was performed until the pressures was 10 mbar. And nitrogen or argon was introduced into until the pressure in the reactor reached 1000 mbar, and 1 g lithium hexamethyldisilazane was added to initiate reaction. Anion polymerization reaction was performed at 60° C. for 6 h, and the silicone rubber was obtained. Molecular weight distribution of the obtained silicone rubber is 1.33, number-average molecular weight thereof is 13 kDa, viscosity thereof is 5500 mPa·s.

100 g brominated phenolic resin and 200 g xylene were added into 100 g silicone rubber, reaction was performed at 100° C. for 24 h. And gelation occurred obviously in the reaction.

Comparison Example 3

100 g phenolic resin with polymerization degree of 10-20, 20 g bromopropylene and 100 g acetone were added into a 500 mL reactor, and then 30 g potassium carbonate were added. The temperature was increased to 85° C., and reflux reaction was performed for 24 h. The pressure was reduced to 10 mbar to remove the residual acetone after insoluble substance was filtered out, and the vinylated phenolic resin was obtained.

100 g vinylated phenolic resin, 200 g xylene and 0.1 g O-chloroperoxybenzoic acid were added into 100 g silicone rubber which is same as that in the example 1. Explosive polymerization happened as reaction is uncontrollable after the reaction was performed at 80° C. for 2 h, and then gelation occurred.

Comparison Example 4

100 g phenolic resin with polymerization degree of 10-20, 20 g bromopropylene and 100 g acetone were added into a 500 mL reactor, and then 30 g potassium carbonate was added. The temperature was increased to 85° C., and reflux reaction was performed for 24 h. The pressure was reduced to 10 mbar to remove the residual acetone after insoluble substance was filtered out, and the vinylated phenolic resin was obtained.

100 g octamethylcyclotetrasiloxane, 10 g tetramethylcyclotetrasiloxane, 0.1 g trifluoromethanesulfonic acid and 100 g xylene were added into a 500 mL reactor, polymerization was performed for 3 h at 80° C. And silicone rubber of which a side group contains Si—H was obtained, molecular weight distribution is 1.85, molecular weight is 3000 Da, viscosity is 2000 mPa·s.

100 g vinylated phenolic resin, 200 g xylene, 0.1 g custer catalyst were added into 100 g silicone rubber of which a side group contains Si—H. Implosinon happened as reaction is uncontrollable after the reaction was performed at room temperature for 2 h, and then gelation occurred.

The above-mentioned comparison example 3 and comparison example 4 adopt a direct synthesis method rather than coupling onto method, and both have obvious gelation reaction after synthesis.

The invention claimed is:

1. A silicone rubber, a structural formula of which is shown as Formula I:

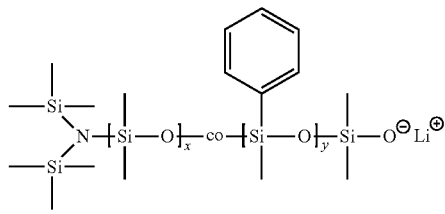

Formula I wherein x=70-80, y=10-20.

2. The silicone rubber according to claim 1, wherein number-average molecular weight of the silicone rubber is 10 kDa-15 kDa, viscosity of the silicone rubber is 5000 mPa·s-7000 mPa·s and molecular weight distribution of the silicone rubber is 1.3-1.4.

3. A method for preparing the silicone rubber according to claim 1, comprising:
dissolving 100 parts by mass of octamethylcyclotetrasiloxane and 18-22 parts by mass of tetramethyltetraphenylcyclotetrasiloxane into a solvent,
cooling, evacuating, introducing an inert gas,
then adding 0.4-0.6 parts by mass of lithium hexamethyldisilazane, and
reacting at 60-70° C. for at least 6 h to obtain the silicone rubber.

4. The method for preparing the silicone rubber according to claim 3, further comprising a step for synthetizing the lithium hexamethyldisilazane which comprises:
dissolving 16 parts by mass of hexamethyldisilazane into 40-50 parts by mass of gasoline, then adding dropwise 6-7 parts by mass of n-butyl lithium, and performing the reaction to obtain the lithium hexamethyldisilazane;
wherein in the process of the dropwise addition and reaction, the inert gas is continuously introduced;
the dropwise addition lasts for above 30 min;
the temperature of the reaction is controlled to 10-20° C.;
the inert gas is nitrogen or argon.

5. The method for preparing the silicone rubber according to claim 4, wherein the dropwise addition lasts for 30-40 min.

6. The method for preparing the silicone rubber according to claim 3, wherein
the octamethylcyclotetrasiloxane and tetramethyltetraphenylcyclotetrasiloxane are dissolved into the solvent in a dry and anhydrous atmosphere with a pressure of 1000-1100 mbar;
the cooling is performed until the temperature is −50~60° C.;
the evacuation is performed until the pressure is 10-20 mbar.

7. The method for preparing the silicone rubber according to claim 3, wherein
the introduction of the inert gas is performed until the pressure is 1000-1100 mbar;
the inert gas is nitrogen or argon.

8. The method for preparing the silicone rubber according to claim 3, wherein the solvent is toluene or xylene.

9. A phenolic modified silicone rubber resin made from the silicone rubber according to claim 1, the structure formula of which is shown as Formula II:

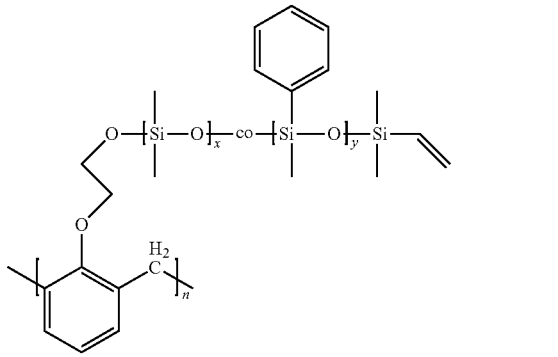

Formula II wherein n, x, y are degrees of polymerization, n=10-20, x=70-80, y=10-20.

10. The phenolic-modified silicone rubber resin according to claim 9, wherein the number-average molecular weight of the phenolic-modified silicone rubber resin is 20-30 kDa, viscosity of the phenolic-modified silicone rubber resin is 10000 mPa·s-15000 mPa·s, and molecular weight distribution of the phenolic-modified silicone rubber resin is 2-3.

11. A method for preparing the phenolic-modified silicone rubber resin according to claim 9, orderly comprising:
a step of chemical grafting modification which comprises: adding 90-110 parts by mass of brominated phenolic resin and 180-220 parts of organic solvent into 100 parts by mass of silicone rubber, and reacting at 70-80° C. for 24-48 h until the solution is clear and transparent; and
a step of end capping which comprises: adding 9-11 parts by mass of capping agent, and reacting for another 4-5 h to obtain a reaction liquid containing phenolic modified silicone rubber resin.

12. The method for preparing the phenolic-modified silicone rubber resin according to claim 11, further comprising a step of removal of organic solvent and small molecular which comprises: removing the organic solvent from the reaction liquid containing phenolic modified silicone rubber resin at 100-110° C. and a pressure of 10-20 mbar, and removing the small molecular by scraper distillation at 150-160° C. and a pressure of 0.1-0.2 mbar to obtain the phenolic-modified silicone rubber resin being target product.

13. The method for preparing the phenolic-modified silicone rubber resin according to claim 11, wherein synthesis of the brominated phenolic resin comprises:
 a step for synthetizing the hydroxylated phenolic resin which comprises:
 dissolving 100 parts by mass of phenolic resin and 15-25 parts by mass of bromoethanol into a first solvent, adding 25-35 parts by mass of potassium carbonate, heating up to 80-85° C. and performing reflux reaction at this temperature for 20-28 h, filtering out insoluble substance, and then reducing pressure to remove residual of the first solvent to obtain the hydroxylated phenolic resin;
 a step of synthetizing the brominated phenolic resin which comprises:
 dissolving the hydroxylated phenolic resin into 80-120 parts by mass of a second solvent, adding 8-12 parts by mass of phosphorus tribromide and 18-22 parts by mass of pyridine, reacting for 20-28 h, and then reducing pressure to remove the second solvent to obtain the brominated phenolic resin.

14. The method for preparing the phenolic-modified silicone rubber resin according to claim 13, wherein the phenolic resin is a linear phenolic resin which is soluble in the first solvent; degree of polymerization of the phenolic resin is 10 to 20.

15. The method for preparing the phenolic-modified silicone rubber resin according to claim 13, wherein the first solvent is acetone; the second solvent is dichloromethane or trichloromethane.

16. The method for preparing the phenolic-modified silicone rubber resin according to claim 11, wherein
 the organic solvent is toluene or xylene;
 the capping agent is divinyltetramethyldisiloxane or vinyldimethylchlorosilane.

17. The method for preparing the phenolic-modified silicone rubber resin according to claim 11, further comprising a step of curing which comprises:
 taking 100 parts by mass of the phenolic-modified silicone rubber resin, adding 4-6 parts by mass of hydrogen-containing polysiloxane and 0.1-0.2 parts by mass of platinum catalyst and being placed for above 48 h at room temperature to finish the curing.

18. The method for preparing the phenolic-modified silicone rubber resin according to claim 17, wherein degree of polymerization of the hydrogen-containing polysiloxane is 4-10.

19. The method for preparing the phenolic-modified silicone rubber resin according to claim 17, wherein the platinum catalyst is chloroplatinic acid or a complex of zerovalent platinum with divinyltetramethyldisiloxane.

20. The method for preparing the phenolic-modified silicone rubber resin according to claim 17, wherein the platinum catalyst is custer catalyst.

* * * * *